(12) United States Patent
Peczalski et al.

(10) Patent No.: US 9,904,296 B2
(45) Date of Patent: Feb. 27, 2018

(54) CONTROLLING FLOW IN A FLUID DISTRIBUTION SYSTEM

(71) Applicant: Honeywell International Inc., Morristown, NJ (US)

(72) Inventors: Andrzej Peczalski, Eden Prairie, MN (US); Paul Wacker, Plymouth, MN (US)

(73) Assignee: Honeywell International Inc., Morris Plains, NJ (US)

(*) Notice: Subject to any disclaimer, the term of this patent is extended or adjusted under 35 U.S.C. 154(b) by 178 days.

(21) Appl. No.: 14/242,469

(22) Filed: Apr. 1, 2014

(65) Prior Publication Data

US 2015/0277446 A1 Oct. 1, 2015

(51) Int. Cl.
| | | |
|---|---|---|
| F16K 31/02 | (2006.01) | |
| G05D 7/06 | (2006.01) | |
| G01F 15/00 | (2006.01) | |
| G01F 1/58 | (2006.01) | |
| G01F 1/05 | (2006.01) | |
| G01F 1/34 | (2006.01) | |

(52) U.S. Cl.
CPC ........ *G05D 7/0635* (2013.01); *G01F 15/005* (2013.01); *G05D 7/0641* (2013.01); *G01F 1/05* (2013.01); *G01F 1/34* (2013.01); *G01F 1/58* (2013.01); *Y10T 137/0318* (2015.04); *Y10T 137/7759* (2015.04)

(58) Field of Classification Search
CPC ....... G05D 7/0635; G01F 15/005; G01F 1/58; G01F 1/05; G01F 1/34; Y10T 137/0318; Y10T 137/7759
USPC ...................................... 137/485, 486, 487.5
See application file for complete search history.

(56) References Cited

U.S. PATENT DOCUMENTS

| | | | | |
|---|---|---|---|---|
| 3,803,810 A | * | 4/1974 | Rosenberg | A61M 5/38 |
| | | | | 128/205.12 |
| 4,190,426 A | * | 2/1980 | Ruschke | A61M 5/36 |
| | | | | 128/205.12 |
| 4,827,970 A | * | 5/1989 | Sugisaki | A61M 5/1689 |
| | | | | 137/486 |
| 5,152,309 A | * | 10/1992 | Twerdochlib | G05D 7/0635 |
| | | | | 137/486 |
| 5,347,264 A | * | 9/1994 | Bjorkman | F17D 5/00 |
| | | | | 137/487.5 |

(Continued)

FOREIGN PATENT DOCUMENTS

| | | |
|---|---|---|
| WO | 98/25086 A1 | † 6/1998 |
| WO | 2009/156010 A1 | † 12/2009 |

OTHER PUBLICATIONS

"Belimo Energy Valve." Retrieved from: http://energyvalve.com/.
(Continued)

*Primary Examiner* — Minh Le
(74) *Attorney, Agent, or Firm* — Brooks, Cameron & Huebsch, PLLC

(57) ABSTRACT

Apparatuses, methods and systems for controlling flow in a fluid distribution system are described herein. One apparatus includes a flow sensor configured to determine a flow of a fluid through a conduit of a fluid distribution system, a valve associated with the conduit and coupled to an actuator, and a controller connected to the flow sensor and the actuator.

18 Claims, 4 Drawing Sheets

(56) References Cited

U.S. PATENT DOCUMENTS

| | | | | |
|---|---|---|---|---|
| 5,394,755 | A * | 3/1995 | Sudo | G01F 1/34 73/861 |
| 5,568,825 | A * | 10/1996 | Faulk | E03B 7/071 137/486 |
| 5,813,496 | A * | 9/1998 | Hyvonen | F16N 7/40 137/487.5 |
| 5,927,321 | A | 7/1999 | Bergamini | |
| 5,934,302 | A | 8/1999 | Nemelka | |
| 5,996,739 | A * | 12/1999 | Hoffmann | F01M 1/16 137/486 |
| 6,119,715 | A * | 9/2000 | Russell | H02B 13/055 137/240 |
| 6,152,168 | A * | 11/2000 | Ohmi | G05D 7/0647 137/486 |
| 6,230,738 | B1 * | 5/2001 | Watanabe | F16K 31/004 137/486 |
| 6,302,130 | B1 * | 10/2001 | Ohmi | G05D 7/0635 137/14 |
| 6,360,772 | B1 * | 3/2002 | Wu | G05D 7/0635 137/486 |
| 6,471,487 | B2 * | 10/2002 | Keilty | G05D 7/0688 137/2 |
| 6,508,859 | B1 * | 1/2003 | Zia | B01D 19/0031 210/188 |
| 6,792,799 | B2 | 9/2004 | Ford | |
| 7,114,517 | B2 * | 10/2006 | Sund | G01F 1/8413 137/486 |
| 7,140,384 | B2 * | 11/2006 | Kang | G05D 7/0635 118/715 |
| 7,681,607 | B2 * | 3/2010 | Palmer | F04B 49/22 137/205 |
| 7,918,238 | B2 * | 4/2011 | Tanaka | G01F 1/6847 137/10 |
| 7,975,718 | B2 * | 7/2011 | Ngo | C23C 16/4485 137/486 |
| 8,019,481 | B2 * | 9/2011 | Yamaguchi | G05D 7/0664 137/486 |
| 8,072,343 | B2 * | 12/2011 | Flanders | F16K 37/0083 137/487.5 |
| 8,307,845 | B2 * | 11/2012 | Kouchi | G01F 1/363 137/486 |
| 8,365,762 | B1 * | 2/2013 | Trotter | B64D 1/18 137/485 |
| 8,662,856 | B2 * | 3/2014 | Christensen | F04B 17/05 137/487.5 |
| 8,833,695 | B2 * | 9/2014 | Dhuri | F01D 17/26 137/12 |
| 9,074,801 | B2 * | 7/2015 | Brown | F25B 45/00 |
| 2003/0117289 | A1 | 6/2003 | Uhler | |
| 2005/0049755 | A1 | 3/2005 | Boger | |
| 2005/0126635 | A1 * | 6/2005 | Addink | G05D 7/0635 137/487.5 |
| 2007/0095400 | A1 * | 5/2007 | Bergquist | F16K 7/14 137/485 |
| 2007/0110636 | A1 * | 5/2007 | Lee | H01L 21/67017 422/110 |
| 2009/0165866 | A1 | 7/2009 | Fima | |
| 2011/0048551 | A1 * | 3/2011 | Tanaka | G05D 7/0635 137/486 |
| 2011/0114202 | A1 * | 5/2011 | Goseco | E03B 7/04 137/487.5 |
| 2011/0162742 | A1 * | 7/2011 | Ulens | F24D 19/1015 137/624.27 |
| 2011/0220213 | A1 * | 9/2011 | Cabrera | G01F 1/8413 137/4 |
| 2011/0247696 | A1 * | 10/2011 | Zolock | G05D 7/0635 137/2 |
| 2012/0186655 | A1 * | 7/2012 | Smirnov | G05D 7/0635 137/1 |
| 2012/0315767 | A1 * | 12/2012 | Sasaki | C23C 16/325 438/758 |
| 2014/0130883 | A1 * | 5/2014 | Couture | B64D 13/00 137/12 |
| 2014/0230910 | A1 * | 8/2014 | Guan | G01N 30/28 137/10 |
| 2014/0257720 | A1 * | 9/2014 | Smirnov | G01F 1/6842 702/45 |
| 2014/0299204 | A1 * | 10/2014 | Somani | G01F 15/003 137/486 |
| 2015/0286222 | A1 * | 10/2015 | Goldstein | G05D 7/0635 700/282 |
| 2015/0346733 | A1 * | 12/2015 | Yates | G05D 7/0635 700/282 |
| 2016/0054741 | A1 * | 2/2016 | Thuillard | F24F 11/008 700/276 |
| 2016/0201818 | A1 * | 7/2016 | Bahalul | F16K 31/385 137/202 |

OTHER PUBLICATIONS

"Eltek Water valve with integrated flowmeter." Retrieved from: http://ww.eltekgroup.it/.

International Search Report from related PCT Application No. PCT/US2015/021516 dated Jun. 22, 2015, 2 pp.

International Preliminary Report on Patentability and Written Opinion from related PCT Application No. PCT/US2015/021516 dated Jun. 22, 2015, 11 pp.

\* cited by examiner
† cited by third party

CONTROLLING FLOW IN A FLUID DISTRIBUTION SYSTEM

TECHNICAL FIELD

The present disclosure relates to apparatuses, methods and systems for controlling flow in a fluid distribution system.

BACKGROUND

Fluid distribution systems can provide fluid to various locations and can be used in structures as heating and/or cooling systems. Fluid distribution systems can include many different devices, such as boilers, chillers, cooling towers, and radiators, for instance, as well as others. Such devices may be connected by various conduits of the system (e.g., pipes, tubes, lines, etc.), which may include valves.

Previous approaches to fluid distribution may lack the ability to determine fluid flow through various points in the system. As a result, previous approaches may deal with problems like valve slamming, surges, and/or air pockets by using sophisticated valves. In addition to the increased cost for such valves, previous approaches incur costs associated with increasing head pressure to allow for proportional valves, air pockets, and/or other system problems. The high-head distribution systems associated with previous approaches, especially those in large structures, translate to increased energy needed to pump the fluid as well as higher costs in storing the fluid.

Previous approaches may additionally lack the capability to measure the energy of a flow, for instance. Without such capability, managing and/or monetizing energy usage (e.g., charging for energy usage) may be difficult under previous approaches.

DETAILED DESCRIPTION

Figure 1:
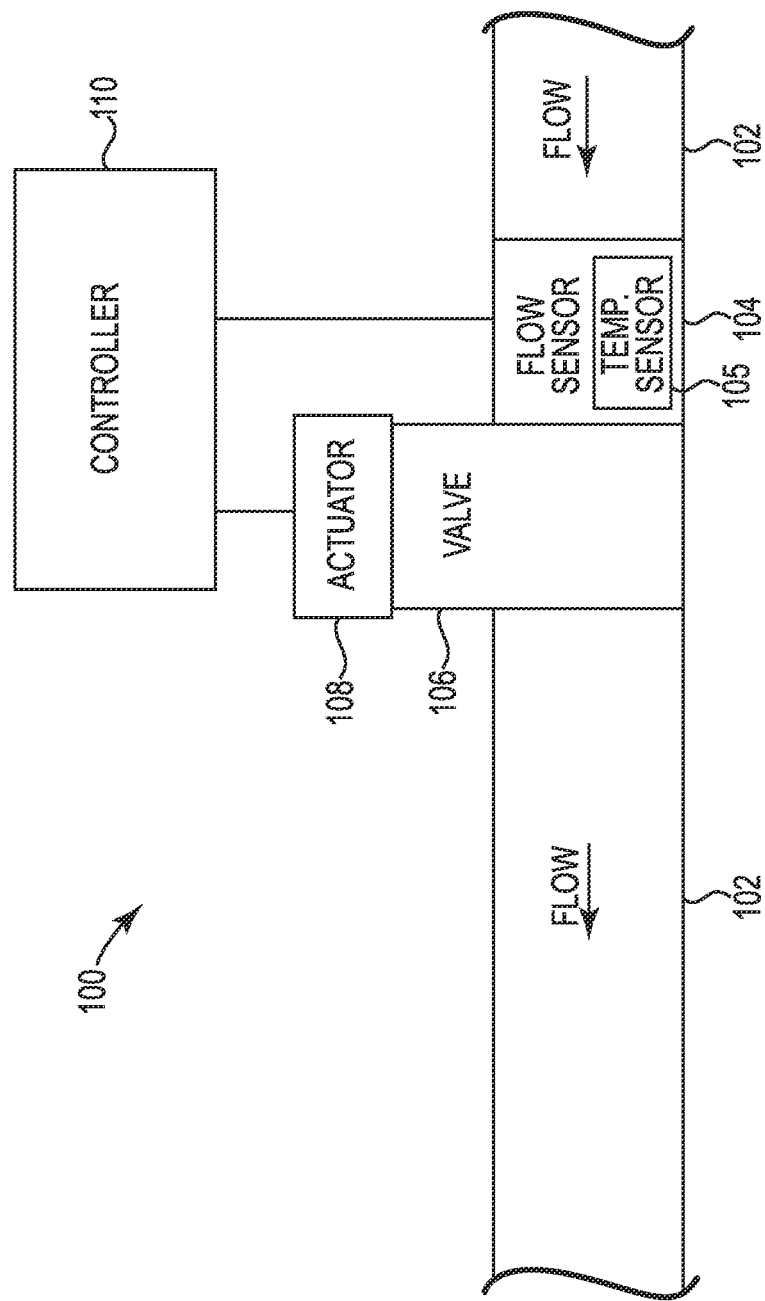
FIG. 1 illustrates an apparatus for controlling flow in a fluid distribution system in accordance with one or more embodiments of the present disclosure.

Devices, methods, and systems for controlling flow in a fluid distribution system are described herein. For example, one or more embodiments include a flow sensor configured to determine a flow of a fluid through a conduit of a fluid distribution system, a valve associated with the conduit and coupled to an actuator, and a controller connected to the flow sensor and the actuator.

Fluid distribution in accordance with embodiments of the present disclosure can integrate fluid valves with flow sensors. As a result, information about flow at each valve can be used to locally control the valve (e.g., by opening and/or closing the valve). Further, such information can be used in controlling various aspects of an entire fluid distribution system, such as level of head pressure, energy flow, and/or timing of the valve(s) opening and/or closing, for instance.

Where the present disclosure discusses fluid, it is intended that fluid generally refers to liquid. Examples of fluids in accordance with embodiments of the present disclosure include liquids capable of being conducted through a conduit, such as water (e.g., fresh water, sea water, heavy water, etc.), oil(s), and/or alcohol(s) (e.g., propylene glycol, ethylene glycol, etc.), as well as solutions and/or mixtures of these and/or other materials. However, in various embodiments, fluid can refer to a gas (e.g., steam) and/or a mixture of liquid and gas. Embodiments of the present disclosure do not limit conduits (e.g., pipes, tubes, lines, etc.) to a particular type, material, and/or shape.

Whereas previous approaches suffer energy losses from inefficient use of pump energy and/or non-optimal operation of system devices (e.g., non-optimal temperature drop on heat exchangers), embodiments of the present disclosure can enable highly flexible control systems using variable speed pumps, for instance. Such variability can offer improvements in energy efficiency, installation, and maintenance cost over previous approaches in, for example, a manner analogous to the improvements offered by Variable Air Volume technology over Constant Air Volume technology Heating Ventilation and Air Conditioning (HVAC) systems (e.g., approximately 32%).

Determining flow at various points in a distribution system can allow embodiments of the present disclosure to use less sophisticated—and therefore less expensive—valves than previous approaches (e.g., butterfly or full bore ball valves instead of flap and/or piston valves). For example, by differentiating between air flow and fluid flow, embodiments herein can alert the system to air pocket formation and/or initiate air purging when an air pocket is found. Such embodiments can be contrasted with previous approaches to fluid distribution, which may employ sophisticated (e.g., expensive) valves to combat air pockets. Further, valves in accordance with embodiments herein can be larger than in previous approaches, thereby reducing the need for elevated head pressure.

Additionally, embodiments of the present disclosure can determine overall health of a fluid distribution system and initiate preventive maintenance to address various problems. For example, embodiments herein can determine a fouling of a device of a fluid distribution system (e.g., a heat exchanger) by a reduction in its efficiency. A notification can be provided responsive to such a determination, for instance.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of tasks" can refer to one or more tasks.

FIG. 1 illustrates an apparatus 100 for controlling flow in a fluid distribution system in accordance with one or more embodiments of the present disclosure. As previously discussed, fluid can flow through a conduit 102 (e.g., a portion of the conduit 102). As shown in the example illustrated in FIG. 1, the fluid is flowing in a leftward direction indicated by an arrow within the conduit 102.

The flow control apparatus 100 can include a flow sensor 104. The flow sensor 104 can determine a flow of a fluid through the conduit 102. In some embodiments, the flow sensor 104 can be an electromagnetic flow sensor (e.g., Lorenz Force and/or electromagnetic flow meter, hereinafter referred to as "magmeter"), for instance, though embodiments of the present disclosure are not so limited; flow sensor 104 can be various sensor designs configured to determine flow.

Determining flow, as referred to herein, can include sensing, acquiring, measuring, and/or quantifying fluid movement (e.g., bulk fluid movement). Determining flow can include determining a velocity of fluid flowing through conduit 102 (e.g., a particular distance traveled by the fluid over a particular period of time). Flow can be determined continuously and/or at a particular interval. Determining flow can include determining instantaneous flow and/or determining average flow over a particular period of time.

In some embodiments, the flow sensor 104 can be a positive displacement flow meter and/or a differential pressure meter (e.g., a portion of a differential pressure meter). In other embodiments, the sensor 104 can be a portion of an integrated flow sensing/control device having an spring-loaded impeller (e.g., a stepper motor) that varies in position along a longitudinal axis of the conduit 102 based on a level of flow through conduit 102.

In embodiments where the flow sensor 104 is a magmeter, it can include a metering tube to which a magnetic field can be applied. The magnetic field can yield a potential difference proportional to a flow velocity perpendicular to the flux lines. Though one flow sensor is illustrated in FIG. 1, apparatus 100 can include more than one flow sensor. In such embodiments, apparatus 100 can include a plurality of one type of flow sensor (e.g., magmeters) and/or different types of sensors.

In some embodiments, the flow sensor 104 can include a temperature sensor 105. In other embodiments, the temperature sensor 105 may be included independent of the flow sensor 104 and/or not included in the apparatus 100. The temperature sensor 105 can determine a temperature of the fluid constituting the flow. The temperature sensor 105 can be used to calibrate the flow sensor 104, for instance (e.g., using a look-up table).

The temperature sensor 105 can be used in conjunction with the flow sensor 104 to determine an energy associated with the flow as such energy may depend on the velocity of the flow and the temperature of the flow. Whereas previous approaches to controlling flow may lack the capability to measure energy, embodiments in accordance with the present disclosure can allow the measurement, management and/or monetization of energy usage.

The flow control apparatus 100 can include a valve 106. The valve 106 can be associated with the conduit 102. That is, the valve 106 (e.g., a portion of the valve 106) can be in the conduit 102 and/or can control the flow through a portion of the conduit 102. As shown in FIG. 1, the valve 106 can be positioned downstream from the flow sensor 104. As used herein, downstream and/or upstream can refer to locations of components with respect to the direction of a flow.

In some embodiments, the valve 106 can be a butterfly valve, for instance. In other embodiments, the valve 106 can be a ball valve (e.g., a full port ball valve). It is to be understood that embodiments of the present disclosure do not limit the valve 106 to a particular type of valve. Further, though one valve is illustrated in FIG. 1, apparatus 100 can include more than one valve. In such embodiments, apparatus 100 can include a plurality of one type of valve (e.g., butterfly valves) and/or different types of valves. In some embodiments, the valve 106 and the flow sensor 104 can be integrated. That is, the valve 106 and flow sensor 104 can be a unified (e.g., single) component and/or included in a single housing. In some embodiments, such a housing can additionally include various electronics and/or motors associated with the valve 106 (e.g., an actuator, such as actuator 108 discussed below).

Although not shown in FIG. 1 for purposes of clarity, apparatus 100 can include a flow straightener. The flow straightener can minimize rotation and/or remove disturbances from the flow. The flow straightener can minimize nonlaminar flow and/or eddies in the fluid. The flow straightener can be positioned between the flow sensor 104 and the valve 106, for instance, though embodiments of the present disclosure are not limited to such a configuration of apparatus 100; for example, the flow straightener can be positioned upstream with respect to the flow sensor 104.

The flow control apparatus 100 can include an actuator 108. The actuator 108 can be coupled (e.g., mechanically coupled and/or attached) to the valve 106 and can control a state of the valve 106. The state of the valve 106 refers to a position and/or an orientation of the valve. The actuator 108 can be a motor configured to actuate (e.g., move and/or change a state of) the valve 106, for instance.

For example, the actuator 108 can open the valve 106 (e.g., cause the valve to be open) and/or close the valve 106 (e.g., cause the valve to be closed). Further, the actuator can cause the valve 106 to be in various states in a continuum between "open" and "closed." For example, a first state can be open with respect to a second state (e.g., the first state permits a higher flow than does the second state). Conversely a first state can be closed with respect to a second state (e.g., the first state permits a lesser flow than does the second state). Embodiments of the present disclosure do not limit the actuator 108 to a particular type.

The flow control apparatus 100 can include a controller 110. As shown in FIG. 1, the controller 110 can be connected (e.g., communicatively coupled) to the flow sensor 104 and the actuator 108 (and to a computing device, for instance, discussed below in connection with FIGS. 2 and 3). Such a connection can allow signals and/or data to be sent in any direction between flow sensor 104, temperature sensor 105 and controller 110 as well as between controller 110 and actuator 108, for instance. For example, the controller 110 can cause an actuation of actuator 108 such that a state of the valve 106 is changed (e.g., the controller 110 can cause an actuation of the valve 106 from a first state to a second state).

Valves in accordance with one or more embodiments herein (e.g., valves having large dimensions) can be nonlinear valves. That is, a relationship between a flow rate through the valve and different states of the valve (e.g., levels of openness) may be nonlinear. Controller 110 can linearize such valves throughout their operating ranges.

The controller 110 can include logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Controller 110 can be and/or include a computing device configured to execute instructions instead of, or in addition to, logic. Such a computing device can be analogous to the computing device 214 described below in connection with FIG. 2, for instance.

Figure 2:
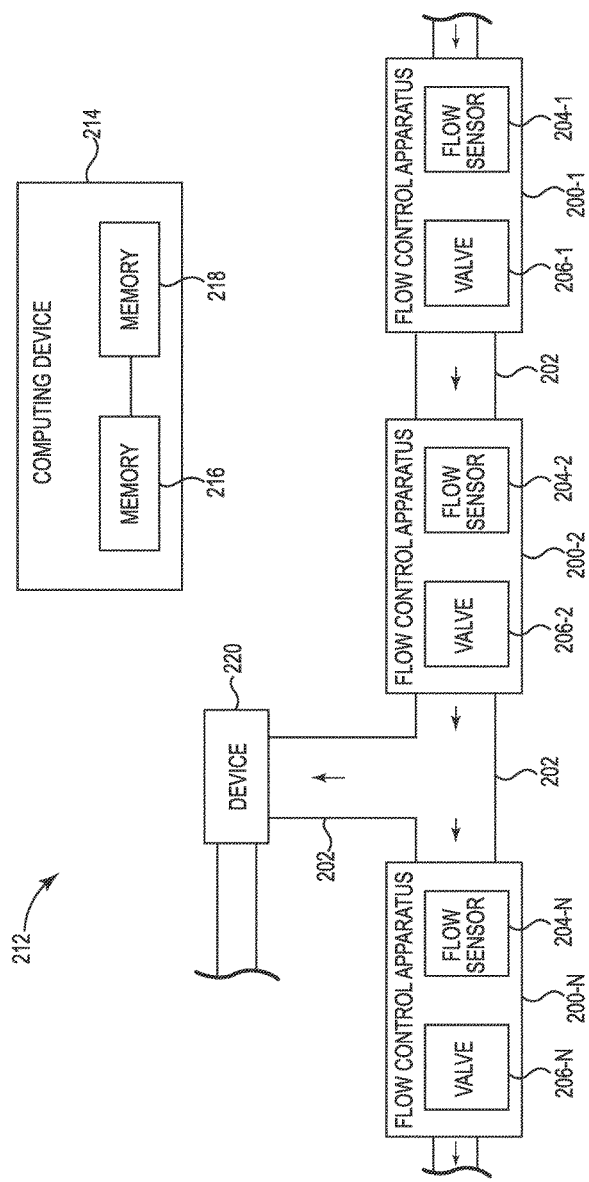
FIG. 2 illustrates a system for controlling flow in a fluid distribution system in accordance with one or more embodiments of the present disclosure.

FIG. 2 illustrates a system 212 for controlling flow in a fluid distribution system in accordance with one or more embodiments of the present disclosure. As shown in FIG. 2, system 212 can include a plurality of flow control apparatuses of a fluid distribution system. Each flow control apparatus can be analogous to flow control apparatus 100 previously described in connection with FIG. 1, for instance. For example, system 212 includes a flow control apparatus 200-1, a flow control apparatus 200-2, and a flow control apparatus 200-N (sometimes generally referred to as "flow control apparatuses 200-1, 200-2, . . . 200-N"

As previously discussed, each of the plurality of flow control apparatuses 200-1, 200-2, . . . 200-N can include a respective flow sensor configured to determine a flow of a fluid through a respective portion of a fluid distribution system. The respective portion of the fluid distribution system where a respective flow is determined can be a portion (e.g., length) of the conduit 202 associated with a particular flow control apparatus. As shown, the flow control apparatuses 200-1, 200-2, . . . 200-N respectively include a flow sensor 204-1, a flow sensor 204-2, and a flow sensor 204-N (sometimes generally referred to as "flow sensors 204-1, 204-2, . . . 204-N").

As previously discussed, each of the plurality of flow control apparatuses can include a respective valve associated with the respective portion configured to control the respective flow through the respective portion. As shown, the flow control apparatuses 200-1, 200-2, . . . 200-N respectively include a valve 206-1, a valve 206-2, and a valve 206-N (sometimes generally referred to as "valves 206-1, 206-2, . . . 206-N"). Though not illustrated in FIG. 2, each of the plurality of flow control apparatuses can include a respective actuator and a respective controller in a manner analogous to flow control apparatus 100 previously discussed in connection with FIG. 1, for instance.

Though the flow control apparatuses 200-1, 200-2, . . . 200-N are shown in FIG. 2 as being connected by a single length of the conduit 202 (e.g., in a serial topology), such illustration is not to be taken in a limiting sense; embodiments in accordance with the present disclosure can include various valves, interconnection nodes, pumps, tanks, fluid sources, etc. It is to be understood that more complex orientations, connections, and/or topologies (e.g., ladder connectivity having reverse return) of hydronic systems are anticipated, though not illustrated herein for purposes of clarity and illustration.

As shown in FIG. 2, system 212 can include a device 220 of a fluid distribution system. The device 220 can be a boiler, a chiller, a cooling tower, a radiator, a fan coil unit, an air handling unit, and/or a fluid heater, for instance, among other fluid distribution system devices. The device 220 can be a device that uses the fluid to perform a number of tasks (e.g., provides cooling) and/or performs a number of tasks upon the fluid (e.g., heats the fluid).

Also illustrated in FIG. 2, system 212 can include a computing device 214. Though not illustrated, computing device 214 can be connected (e.g., wired or wirelessly communicatively coupled) to flow control apparatuses 200-1, 200-2, . . . 200-N and the device 220 allowing signals and/or data to be sent in any direction between computing device 214, flow control apparatuses 200-1, 200-2, . . . 200-N, and the device 220.

The computing device 214 can include a memory 216 and a processor 218 coupled to the memory 216. Memory 216 can be any type of storage medium that can be accessed by processor 218 to perform various examples of the present disclosure. For example, memory 216 can be a non-transitory computer readable medium having computer readable instructions (e.g., computer program instructions) stored thereon that are executable by processor 218 to control fluid flow in accordance with one or more embodiments of the present disclosure.

Memory 216 can be volatile or nonvolatile memory. Memory 216 can also be removable (e.g., portable) memory, or non-removable (e.g., internal) memory. For example, memory 216 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 216 is illustrated as being located in computing device 220, embodiments of the present disclosure are not so limited. For example, memory 216 can also be located internal to another computing resource (e.g., enabling computer readable instructions to be downloaded over the Internet or another wired or wireless connection).

The computing device 214 can receive the respective flows from the plurality of flow control apparatuses 200-1, 200-2, . . . 200-N. In some embodiments, the flows can be received as they are determined (e.g., continuously, periodically, and/or at a particular interval). In other embodiments, the flows can be received in batches, for instance. The computing device 214 can receive other inputs (e.g., from other devices and/or sensors as described in connection with FIG. 3), in addition to the respective flows.

The computing device 214 can determine a flow target associated with the device 220. For example, if the device 220 is a fan coil unit, it may have known operating parameters. Such parameters may include fan speed, temperature set point, and/or ambient temperature, among others. The device 214 (and/or other devices, such as a thermostat) can communicate a number of the parameters to the computing device 214 and computing device 214 can determine a flow required to allow the device 214 to operate based on the parameters. Such a flow can be referred to as a flow target.

The flow target can include a flow requested and/or required by the device 214 to provide desired functionality given a set of operating parameters. Having received a particular fan speed, a particular set point, and a particular ambient temperature, computing device 214 can determine a flow target associated with the device 220, for instance.

Providing the flow target can include changing one or more of the plurality of flows through one or more of the flow control apparatuses 200-1, 200-2, . . . 200-N. Changing the flow(s) can include changing a state of the valve(s) of one or more of the flow control apparatuses 200-1, 200-2, . . . 200-N. For example, if the flow target associated with the device 220 is greater than a flow currently being provided to the device 220, computing device can determine that a flow from flow control apparatus 200-2 should be increased. Accordingly, computing device 214 can cause a state of the valve 206-2 to change (e.g., open). Such a change can be performed in increments over a particular period of time, for instance and/or can be based on a difference between flow received from flow apparatus 200-2 and the flow target associated with the device 220.

It is to be understood that such examples are provided for purposes of illustration and that in complex fluid distribution systems, computing device 214 can change states of multiple valves depending on flow targets associated with multiple devices.

Figure 3:
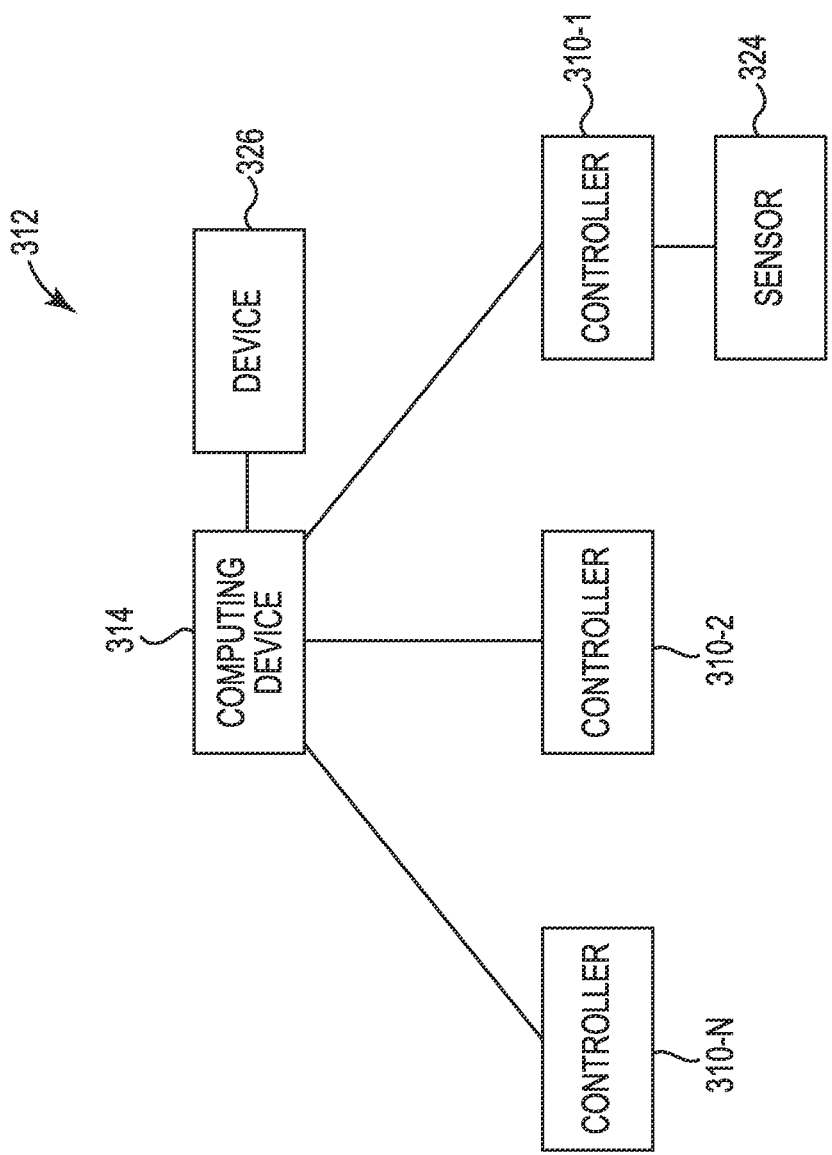
FIG. 3 illustrates another system for controlling flow in a fluid distribution system in accordance with one or more embodiments of the present disclosure.

FIG. 3 illustrates another system 312 for controlling flow in a fluid distribution system in accordance with one or more embodiments of the present disclosure. System 312 can include a plurality of controllers, which can be analogous to the controller 110, previously discussed in connection with FIG. 1. For example, as shown in FIG. 3, system 312 includes a controller 310-1, a controller 310-2, and a controller 310-3 (sometimes generally referred to as "controllers 310-1, 310-2, . . . 310-N"). Each of the controllers 310-1, 310-2, . . . 310-N can be a part of and/or be associated with a respective flow control apparatus, in a manner that controller 110 is a part of and/or associated with flow control apparatus 100, for instance.

The controllers 310-1, 310-2, . . . 310-N can be connected (e.g., wired or wirelessly communicatively coupled) to a computing device 314 allowing signals and/or data to be sent in any direction between the controllers 310-1, 310-2, . . . 310-N and the computing device 314. The computing device 314 can be analogous to the computing device 214, previously described in connection with FIG. 2, for instance.

System 312 includes a sensor 324. The sensor 324 can be analogous to one or more sensors previously discussed (e.g., flow sensor 104), for instance, though embodiments of the present disclosure are not so limited. In some embodiments, the sensor 324 can be a part of a flow control apparatus (e.g., one of flow control apparatuses 200-1, 200-2, . . . 200-N). In other embodiments, the sensor can be independent of a flow control apparatus.

For example, controller 310-1 (as well as controllers 310-2 and/or 310-N) can include a plurality of ports configured to allow connection(s) to a plurality of sensors. For example, sensor 324 can include a flow sensor, a temperature sensor (e.g., analogous to temperature sensor 105, previously described in connection with FIG. 1), a pressure sensor, etc. Further, sensor 324 can include more than one of such sensors, as well as other sensors and/or combinations thereof.

System 312 includes a device 326. Device 326 can be analogous to device 220, for instance, though embodiments herein are not so limited. For example, device 326 can include devices not hydronically connected (e.g., no connected via conduit 202) to a fluid distribution system. The device 326 can be a device that does not use the fluid to perform a number of tasks and/or does not perform any tasks upon the fluid (in contrast with the device 220), for instance.

While device 326 may not be hydronically connected, it may be associated with the fluid distribution system and/or may be a part of the fluid distribution system. That is, device 326 can be a portion of a heating and/or cooling system, for instance. In one embodiment, the device 326 can be a thermostat. As a thermostat, device 326 can provide inputs to computing device 314 that computing device 314 may use to determine flow(s) required and/or requested by device(s) of the fluid distribution system. In various embodiments, device 326 can be and/or include a sensor (e.g., a temperature sensor, a humidity sensor, etc.).

Device 326 is not limited to a thermostat; rather, device 326 can be and/or include various devices not hydronically connected to the fluid distribution system (e.g., fans). Further, device 326 can include devices associated with other systems that may be integrated with a fluid distribution system. For example, device 326 can be a device of an occupancy system that may provide inputs regarding whether heating and/or cooling is required in a room depending on whether the room is occupied.

Figure 4:
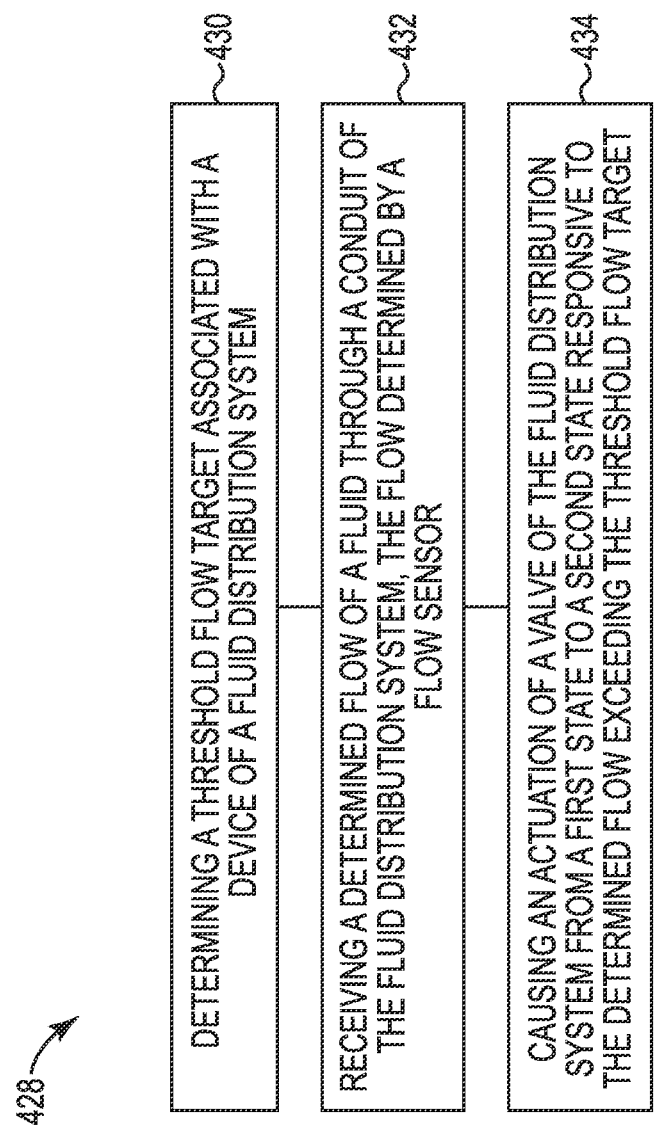
FIG. 4 illustrates a method for controlling flow in a fluid distribution system in accordance with one or more embodiments of the present disclosure.

FIG. 4 illustrates a method 428 for controlling flow in a fluid distribution system in accordance with one or more embodiments of the present disclosure. Method 428 can be performed, for example, by a computing device, such as computing device 214 and/or computing device 314 previously described herein (e.g., in connection with FIGS. 2 and 3, respectively).

At block 430, method 428 includes determining a threshold flow target associated with a device of a fluid distribution system. A threshold flow target can be a flow requested and/or required by a device (e.g., device 220, device 326, computing device 214, and/or computing device 314) to provide desired functionality given a set of operating parameters. The threshold flow target can more than a single flow value. For example, the threshold flow target can include a range of flows.

At block 432, method 428 includes receiving a determined flow of a fluid through a conduit of the fluid distribution system, the flow determined by a flow sensor. Flows can be determined in a manner analogous to that previously discussed, for instance. For example, a flow can be determined by a flow sensor of a flow control apparatus.

At block 434, method 428 includes causing an actuation of a valve of the fluid distribution system from a first state to a second state responsive to the determined flow exceeding the threshold flow target. In some embodiments, exceeding the threshold flow target can include the determined flow being greater than the flow target. In other embodiments, exceeding the threshold flow target can include the determined flow being less than the flow target. For example, if a threshold flow target associated with a particular chiller is 28-30 gallons per minute, a determined flow of 25 gallons per minute exceeds the threshold flow target. Similarly, a determined flow of 32 gallons per minute exceeds the threshold flow target.

Responsive to the determined flow exceeding the threshold flow target, embodiments in accordance with the present disclosure can cause an actuation of a valve (e.g., one or more valves) from a first state to a second state. For example, if the determined flow is less than the threshold flow target, the second state can be open with respect to the first state (e.g., more open than the first state). In another example, if the determined flow is greater than the threshold flow target the second state can be closed with respect to the first state (e.g., more closed than the first state). The difference between the first state and the second state (e.g., the position of the valve at the second state) can be determined based on a difference between determined flow and threshold flow target, for instance.

Though not illustrated in FIG. 4, method 428 can include determining that the flow includes air (e.g., one or more air pockets). In some embodiments, the determined flow exceeding the threshold flow target includes the determined flow having air therein. In such embodiments, the method 428 can include purging the air from the fluid distribution system (e.g., using one or more valves). Further, though not shown, method 428 can include changing a state (e.g., a speed) of a pump associated with the fluid distribution system responsive to the determined flow exceeding the threshold flow target. For example, a pump speed can be increased and/or decreased based on whether the determined flow is greater than or less than the threshold flow target.

Additionally, though not illustrated, method 428 can include determining a temperature (and/or receiving a temperature determined by a sensor) associated with the flow (e.g., the flow through at least one flow control apparatus). The determined temperature can be used in conjunction with the flow to determine an energy associated with the flow. The energy can be displayed, for instance, and/or used to monetize the energy and/or initiating one or more control functions such as those described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An apparatus for controlling flow in a fluid distribution system, comprising:
   a flow sensor configured to determine a flow of a fluid through a conduit of a fluid distribution system, wherein the fluid is a liquid;
   a valve associated with the conduit and coupled to an actuator; and a controller connected to the flow sensor and the actuator,
   wherein the controller includes logic configured to:
      receive a flow target associated with a device of the fluid distribution system;
      cause the actuator to actuate the valve such that a state of the valve is changed based on the flow target;
      determine that the flow of the fluid includes an air pocket;
      purge the air pocket from the flow of the fluid;
      receive an indication associated with a determined fouling of the device of the fluid distribution system based on a reduction of an efficiency of the device; and
      provide a notification responsive to receiving the indication.

2. The apparatus of claim 1, wherein the flow sensor is upstream with respect to the valve.

3. The apparatus of claim 1, wherein the apparatus includes an additional sensor connected to the controller.

4. The apparatus of claim 1, wherein the flow sensor is an electromagnetic flow sensor.

5. The apparatus of claim 1, wherein the flow sensor is configured to determine the flow at a particular interval.

6. The apparatus of claim 1, wherein the flow sensor is configured to determine an average of the flow over a particular period of time.

7. The apparatus of claim 1, wherein the valve is a nonlinear valve.

8. The apparatus of claim 1, wherein the valve is a butterfly valve.

9. A method for controlling flow in a fluid distribution system, comprising:
   determining a threshold flow target associated with a device of a fluid distribution system;
   receiving a determined flow of a fluid through a conduit of the fluid distribution system, the determined flow is determined by a flow sensor, wherein the fluid is a liquid;
   causing an actuation of a valve of the fluid distribution system from a first state to a second state responsive to the determined flow exceeding the threshold flow target;
   determining that the flow of the fluid includes an air pocket;
   purging the air pocket from the flow of the fluid;
   determining a fouling of the device of the fluid distribution system based on a reduction in an efficiency associated with the device; and
   providing a notification responsive to the determination.

10. The method of claim 9, wherein the determined flow exceeding the threshold flow target includes the determined flow being less than the threshold flow target, and wherein the second state is open with respect to the first state.

11. The method of claim 9, wherein the determined flow exceeding the threshold flow target includes the determined flow being greater than the threshold flow target, and wherein the second state is closed with respect to the first state.

12. The method of claim 9, wherein the threshold flow target includes a range of flows.

13. The method of claim 9, wherein the method includes determining a difference between the determined flow and the threshold flow target.

14. The method of claim 13, wherein the method includes determining the second state based on the determined difference.

15. The method of claim 9, wherein the method includes changing a state of a pump associated with the fluid distribution system responsive to the determined flow exceeding the threshold flow target.

16. A system for controlling flow in a fluid distribution system, comprising:
- a device of a fluid distribution system;
- a plurality of flow control apparatuses of a fluid distribution system, each flow control apparatus including:
  - a respective flow sensor configured to determine a respective flow of a fluid through a respective portion of a fluid distribution system, wherein the fluid is a liquid; and
  - a respective valve associated with the respective portion configured to control the respective flow through the respective portion; and
- a computing device, configured to:
  - receive the respective flows from the plurality of flow control apparatuses;
  - determine a flow target associated with the device of the fluid distribution system;
  - cause a change in at least one of the plurality of flows through a respective at least one of the plurality of portions via a change of a state of a respective least one of the plurality of valves based on the determined flow target;
  - determine that the flow of the fluid includes an air pocket;
  - purge the air pocket from the flow of the fluid;
  - determine a fouling of the device of the fluid distribution system based on a reduction in an efficiency associated with the device; and
  - provide a notification responsive to the determination.

17. The system of claim 16, wherein the device of the fluid distribution system is one of a boiler, a chiller, a cooling tower, a radiator, a fan coil unit, an air handling unit, and a fluid heater.

18. The system of claim 16, wherein the system includes a sensor connected to the computing device and not hydronically connected to the fluid distribution system.

* * * * *